Nov. 25, 1941.　　　E. C. HORTON　　　2,264,242
MOTOR VEHICLE
Filed July 22, 1939
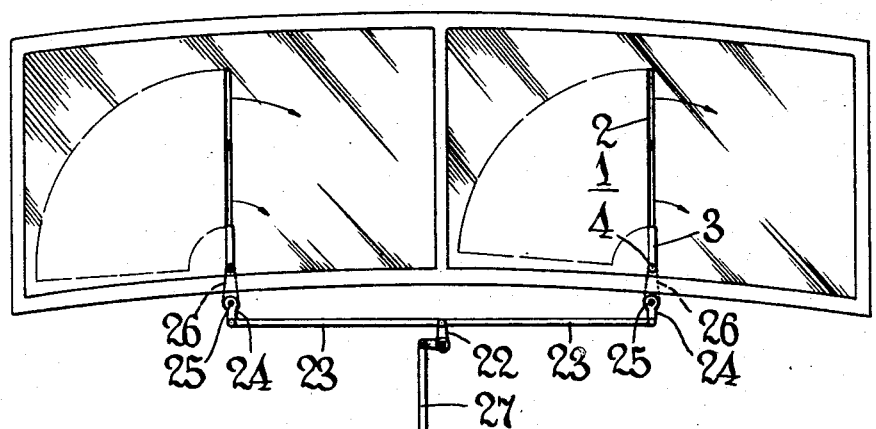
Fig.1.
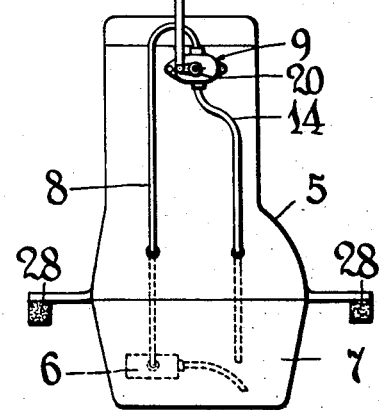
Fig.2.
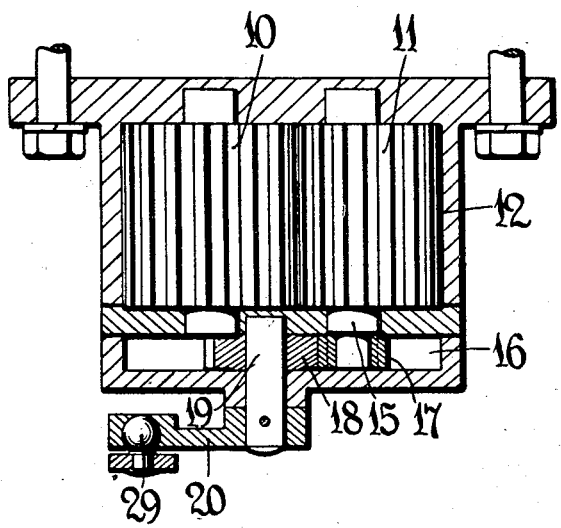
Fig.3.
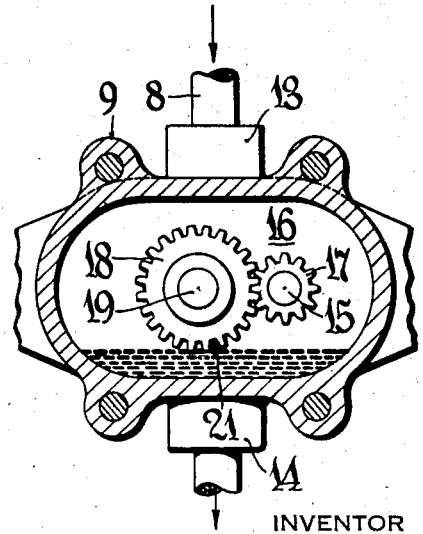
INVENTOR
Erwin C. Horton
BY
Beau, Brooks, Buckley & Beau.
ATTORNEYS Patented Nov. 25, 1941

2,264,242

UNITED STATES PATENT OFFICE 2,264,242

MOTOR VEHICLE

Erwin C. Horton, Hamburg, N. Y., assignor to Trico Products Corporation, Buffalo, N. Y.

Application July 22, 1939, Serial No. 286,043

3 Claims. (Cl. 15—255)

This invention relates to a windshield cleaner system for motor vehicles and primarily to one in which its power is derived from the lubricating system thereof.

Effort has heretofore been made to operate the windshield cleaner from the lubricating system but due to the characteristics of the fluid dealt with, it has been difficult to provide a practical installation, since the oil body would congeal in cold weather and thereby fail to operate the accessory in a satisfactory manner. Furthermore, in the present day motor vehicle construction in which the engine is given a yieldable mounting the vibration set up in the engine has been a handicap to the transmission of power from the oil driven motor thereon to the chassis or adjacent body structure.

The object of the present invention is to provide a motor vehicle construction in which the windshield cleaner system is incorporated in a practical manner for transmitting power to the cleaner from an oil driven motor without impairment of the engine efficiency or waste of the driving fluid.

In the drawing:

Fig. 1 is a diagrammatic view depicting the general arrangement and relation of the cleaner mechanism and the power plant;

Fig. 2 is a horizontal sectional view through the oil driven motor; and

Fig. 3 is a vertical section through the motor.

Referring more particularly to the drawing, numeral 1 designates the windshield of a motor vehicle across which a wiper 2 supported on an arm 3 is reciprocated by a shaft 4 journaled in the adjacent body structure. The engine or power plant 5 is provided with the usual oil pump 6 which takes its oil from the reservoir as provided by the crank case 7 and delivers it to the several engine bearings to effect proper lubrication thereof. From the delivery side of the oil pump a branch passage 8 conducts a flow of liquid to the windshield cleaner motor 9 which may be detachably mounted on the engine block or incorporated therein.

The windshield cleaner motor depicted comprises a pair of intermeshing gears 10 and 11 which are journaled in a chamber 12 formed in the motor housing 9. This chamber is provided with an inlet passage 13, connected to the branch conduit 8, and an outlet passage 14 which returns the oil back to the crank case, and as the oil flows through the chamber 12 the intermeshing gears 10 and 11 will rotate. One gear has its supporting shaft 15 extended through the wall of the chamber into a transmission chamber 16 which may be also formed in the motor housing 9. On this extended shaft is fixed a gear 17 which meshes with a larger gear 18 so that as the motor gears 10 and 11 operate under the impetus of the liquid stream the gear 18 will be driven at a slower speed. Gear 18 is fixed on a shaft 19 having a crank 20 from which power is transmitted to the wiper 2.

The transmission chamber 16 will collect any leakage oil from the chamber 12 along the shaft 15 and return it through a drain port 21 back into the fluid circuit at the outlet side of the motor. This drain port is disposed at a level below the bearing for shaft 19 so that the lubricant level will keep below said bearing and retard seepage of oil along said shaft.

The transmission of power from the crank 20 to the wiper 2 is such as to accommodate the vibration of the engine body on its resilient or yielding mounting 28. According to the form of transmission illustrated, a bell crank lever 22 is mounted on the windshield supporting structure and has one arm connected by a link 23 to a crank arm 24 on an intermediate shaft 25 which latter is joined to the wiper shaft 4 by a chain 26. The other arm of bell crank lever 22 is connected by link 27 to the crank 20 so that as the driving crank revolves the bell crank will be oscillated and impart like movement to the wiper on the glass.

The link 27 is connected to the bell crank arm as well as to the driving crank arm in a universal manner, as indicated at 29, for accommodating irregular vibration of the engine. Its disposition is substantially vertical so that as the lateral vibration of the engine occurs, incidental to the driving torque and other operating stresses, the link will vibrate in an oscillatory manner about its upper end without perceptibly rocking the bell crank one way or another. Therefore, a rigid transmission between the engine and the chassis is provided which will absorb the relative vibration therebetween so that its impress is not made upon the wiper whether operating or parked.

The foregoing description is illustrative of the inventive principles involved, which latter may take on other physical embodiments without departing from the spirit of the invention or the scope claimed.

What is claimed is:

1. In a motor vehicle having a resiliently mounted engine subject to vibration laterally of the vehicle chassis and relative thereto, a drive shaft operable from the engine and journaled thereon to vibrate therewith, said shaft operating about an axis lengthwise of the vehicle, an accessory on the vehicle chassis, a driven member mounted on the chassis for movement about an axis lengthwise of the vehicle and operably connected to the accessory, said shaft and member being equipped with crank arms and arranged one above the other, and a rigid power transmitting member universally connecting one crank arm to the other crank arm in a manner to function free of the relative vibration between the engine and the chassis.

2. In a motor vehicle, a windshield cleaner having an oscillatory driven part on the chassis of the vehicle, a driving part journaled on the engine of the vehicle, the engine being mounted to vibrate laterally of the chassis and relative thereto, said driving and driven parts being arranged one over the other and operating about axes lengthwise of the vehicle, and a rigid link pivotally connected at each end to the two parts for being reciprocated by the driving part to oscillate the driven part, the axes of the pivots extending lengthwise of the vehicle whereby the link may oscillate about the driven pivot to nullify substantially the effect of the lateral vibration of the engine on the windshield cleaner.

3. In a motor vehicle, a windshield cleaner having a driven part on the chassis of the vehicle, a driving part journaled on the engine of the vehicle, the engine being mounted to vibrate laterally of the chassis and relative thereto, said driving and driven parts being arranged one over the other and operating about axes lengthwise of the vehicle, and a rigid member connected at its ends to said driving and driven parts in a manner to permit the driving end of the rigid member oscillating on the driven part toward nullifying the effect of the engine vibration on the windshield cleaner.

ERWIN C. HORTON.